Jan. 29, 1957    H. C. DANIELSON    2,779,555
WING FLAP ACTUATING MECHANISM
Filed July 5, 1952    3 Sheets-Sheet 1
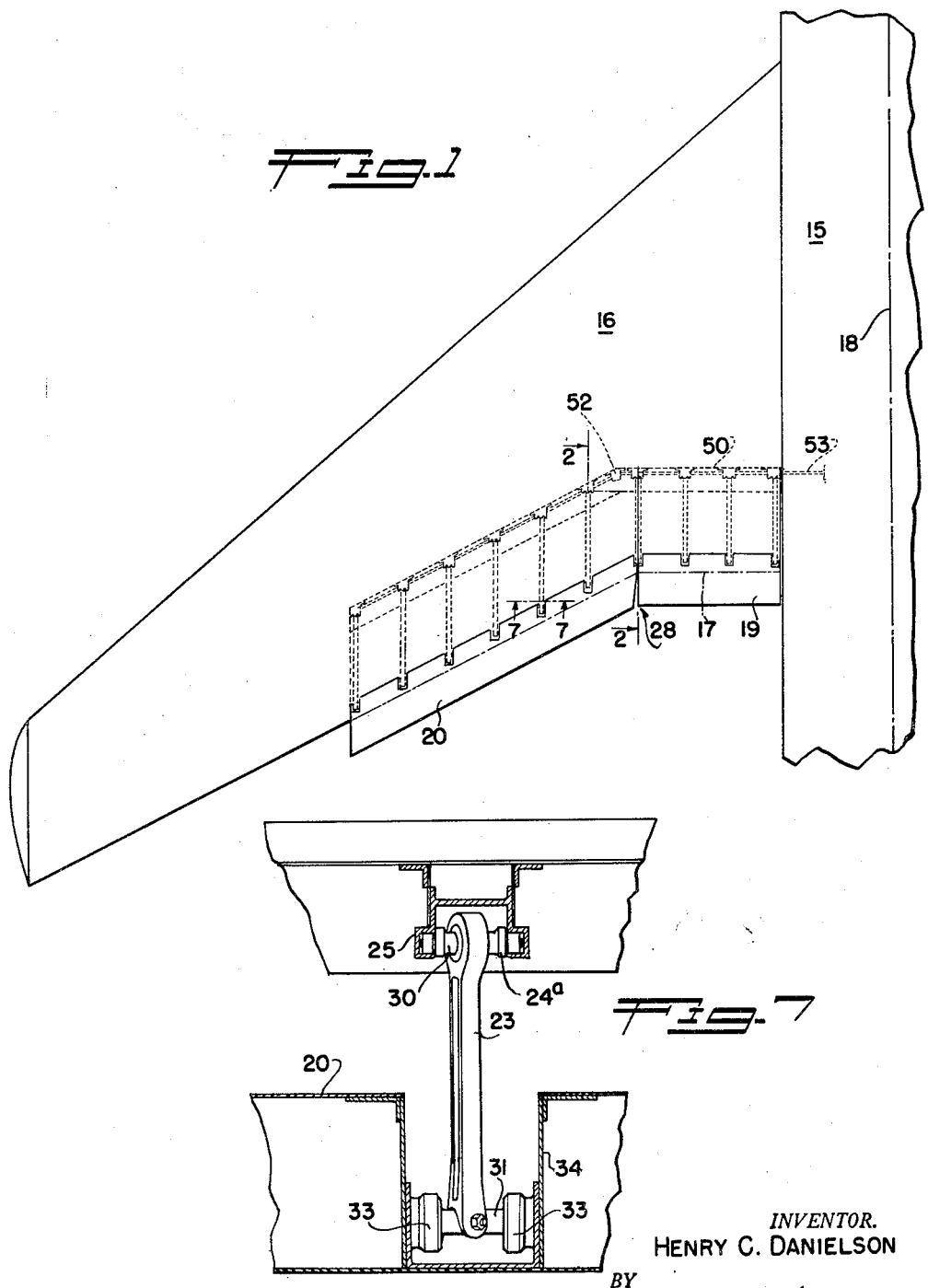
INVENTOR.
HENRY C. DANIELSON
BY
George C. Sullivan
Agent

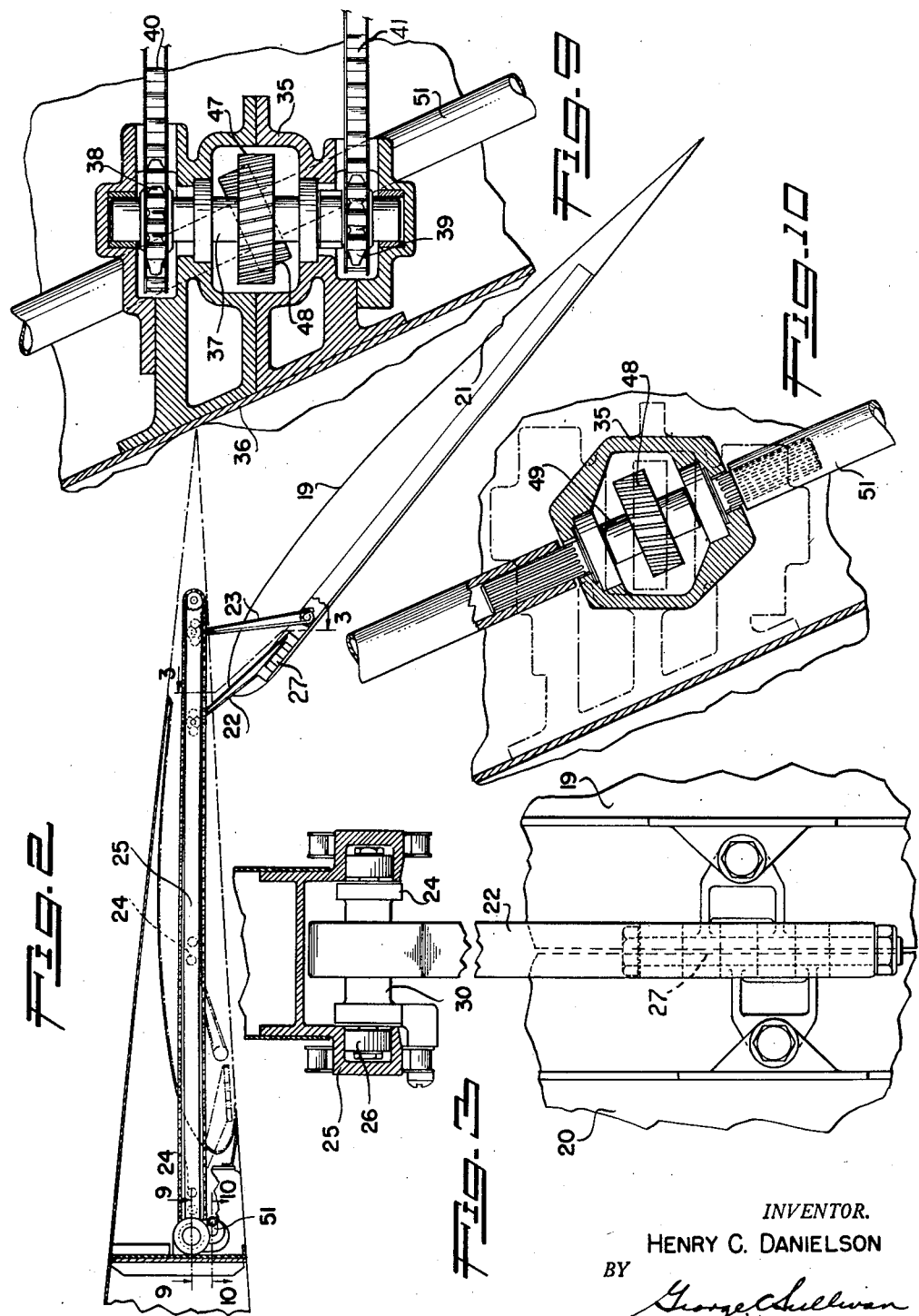

Jan. 29, 1957 H. C. DANIELSON 2,779,555
WING FLAP ACTUATING MECHANISM
Filed July 5, 1952 3 Sheets-Sheet 3
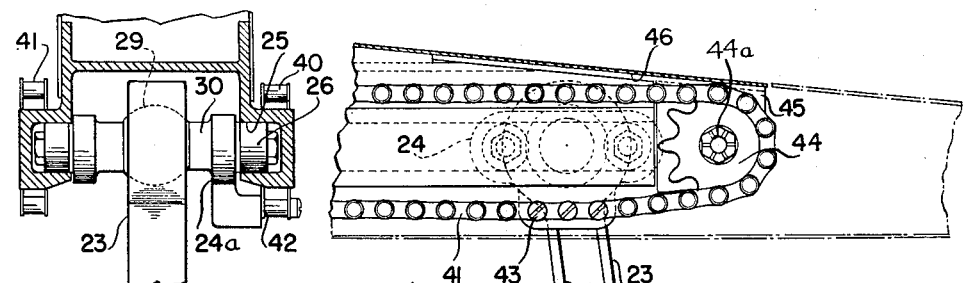
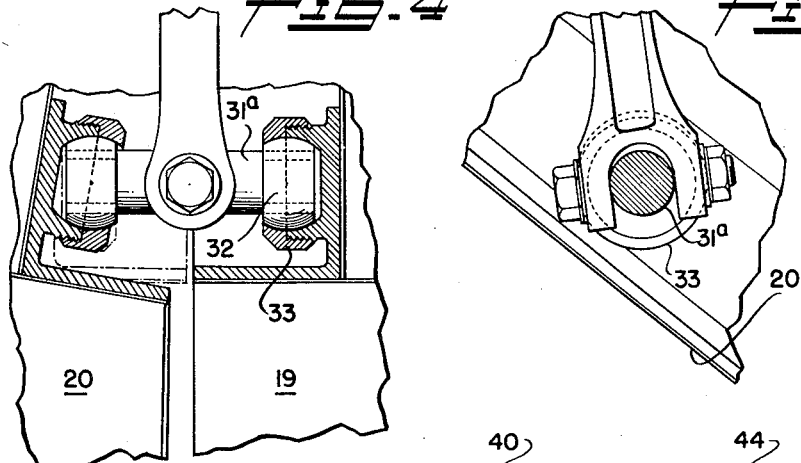
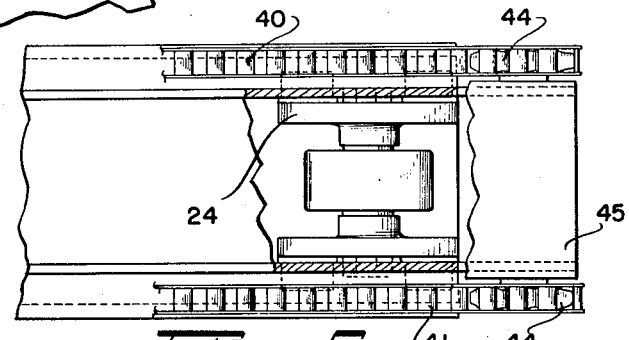
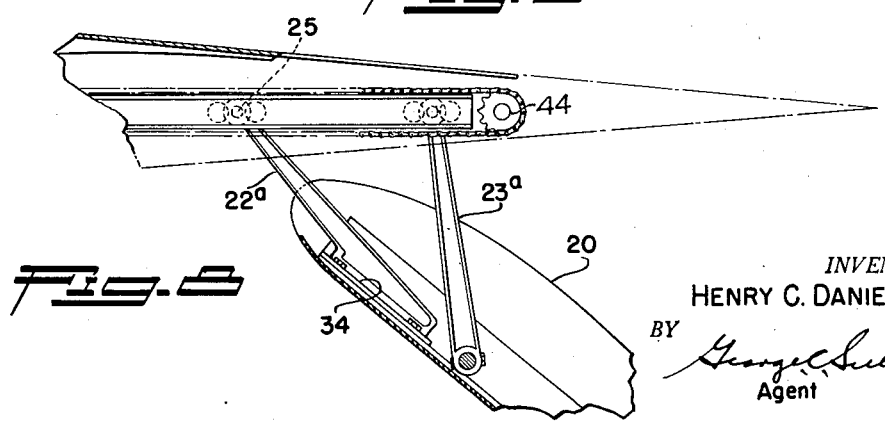
INVENTOR.
HENRY C. DANIELSON
BY
George C. Sullivan
Agent

United States Patent Office 2,779,555
Patented Jan. 29, 1957

2,779,555

WING FLAP ACTUATING MECHANISM

Henry C. Danielson, Van Nuys, Calif., assignor to Lockheed Aircraft Corporation, Burbank, Calif.

Application July 5, 1952, Serial No. 297,205

7 Claims. (Cl. 244—42)

This invention relates to an improved and simplified actuating mechanism for extendable flaps normally housed in the trailing edges of airplane wings, and has particular reference to the operation of such flaps parallel to the longitudinal axis of the airplane, regardless of the plan form of the trailing edge of the wing, as in the case of swept or tapered wings for example.

Extendable trailing edge flaps have heretofore been arranged to operate normal to the trailing edges of the wing, as in the Richter Patent No. 2,348,150 for example. If such flaps are applied to swept wings the span thereof must be reduced to avoid interference with the fuselage at the inboard end, and deviations from a straight line wing trailing edge produces further possibilities of flap interference. It is accordingly an object of this invention to provide flap operating mechanism to extend, deflect, and retract flaps of the type described in a direction parallel to the longitudinal axis of the airplane regardless of the plan form of the trailing edges of the wing.

It is also an object of this invention to provide a flap tilting and operating mechanism based on the differential operation of a pair of separate flap carriages separately connected to the flap and operating in a single straight track that can be located within the profile of thin wing trailing edges in constant relationship to the bottom surface of the wing throughout the span thereof in which the flap or flaps are normally housed when retracted.

It is a further object of this invention to provide an improved and simplified flap operating mechanism of the type described adapted to operate various flap segments each coextensive with straight sections of a wing trailing edge and each operable parallel to the airplane longitudinal axis regardless of the deviation of angle of the wing trailing edge from a direction normal to said angle.

It is another object of this invention to provide a flap operating mechanism of the type described wherein a series of operating mechanisms are flexibly linked to a flap with provisions to allow for wing and flap flexibility under varying loads.

Other and further objects of this invention will become apparent as the description of a specific embodiment proceeds; the chosen embodiment being illustrated in the drawings wherein:

Figure 1 is a plan view of a swept wing type of airplane wherein flaps embodying my invention are shown in their extended and deflected positions.

Figure 2 is an enlarged section taken on the line 2—2 showing the flap operating mechanism common to both flaps, with the flap retracted position also indicated in dotted lines.

Figure 3 is an enlarged section on the line 3—3 of Figure 2 showing the forward or control link connected to both flaps for the simultaneous operation thereof.

Figure 4 is an enlarged view of the rear link common to the separate flaps showing means to accommodate the separation of the trailing edges of the flaps as the latter are extruded.

Figure 5 is a side view of the rear link of Figure 4.

Figure 6 is a fragmentary top view of Figure 5 showing the outboard chain sprockets and the top of the rear link in its extended position.

Figure 7 is a rear view of the extended rear link, as installed in the swept flap, taken on the line 7—7 of Figure 1.

Figure 8 is a fragmentary detail of the flap mounting of the front link as used at track stations other than that of Figure 3.

Figure 9 is an enlarged detail, taken on the line 9—9 of Figure 2 showing the sprocket drive for the swept flap carriages.

Figure 10 is an enlarged detail of the gear box shown in Figure 9 taken on the line 10—10 of Figure 2.

As shown on the drawings:

A portion of an airplane fuselage 15 is shown with a semi span swept wing 16 of Figure 1, wherein the usual planform wing root fillet is replaced by a straight section 17 normal to the fuselage axis 18 in order to accommodate an inner flap section 19. An outer flap section 20 is positioned beneath the swept portion of the trailing edge of the wing, and extends outwardly along the wing to the usual outboard aileron position (not shown). In the case of both flap sections the rear portion of the flaps form the actual trailing edge of the wing when retracted, as indicated by the break 21 in the top surface of the flap. The under side of the flaps fair into the bottom side of the wing and form continuations thereof when the flaps are retracted.

Referring to Figure 2, which shows the inboard flap 19 in extended position, the flap is supported and its angular position or deflection controlled by front and rear links 22 and 23 both universally attached to carriages 24 differentially movable in a straight track comprising opposed channels 25 rigidly supported by the internal structure of the wing. The carriages 24 have pairs of rollers 26 on each side which engage in the channels 25. The lower end 27 of the front link 22 is hingedly and pivotally attached to both flaps 19 and 20 to compensate for relative movements therebetween, as the outer flap 20 moves on a different path than the inner flap 19 because of its swept position, so that the inner trailing edge of the flap 20 tends to open up a gap, indicated at 28 in Figure 1, as the two flaps are extended.

The universal connection mentioned for the carriage end of both links comprises a spherical bearing 29 on a cross pin 30 forming part of the carriage. In the inboard flap actuators the axis of the pin 30 is normal to the track axis, but in the outboard actuators, as shown in Figure 7 the pin axis is parallel to the swept angle of the flap, giving an angularly disposed appearance to the rear link 23 which is actually identical with the link as shown in Figures 4, 5 and 6. Accordingly, the same reference is used for all the rear links, but the carriage for the swept flap actuators is indicated by the reference numeral 24a because of the swept axis of the pin 30 therein.

The lower ends of the rear links 23 are pivoted to the cross pin 31 which in turn is pivoted at its ends by ball joints 32 mounted in brackets 33 fixed to flap structure 34. As in the case of the upper mounting previously described, the axis of pins 31 are disposed normal to the tracks in the inboard flap actuators, and parallel to the swept angle in the outboard flap. In Figure 4 involving the special case of the rear link common to both flaps, the ball joints 32 are made slidable on the cross pin 31a to accommodate the relative motion between the two flaps previously mentioned. This relative motion is shown in exaggerated form at the lower left part of Figure 4, the actual motion at this joint being approximately one half inch in the prototype.

The upper end of the front link 22 is constructed as described in connection with that of the rear link and the carriages 24 and 24a are the same. In the special case of the front link 22 common to the two flaps, as previously described, the lower end 27 is hingedly and pivotally connected to both flaps while being held in fixed alignment with the flaps. The other front links 22a are rigidly attached to interior structure 34 of the flaps are shown in Figure 8 to control the angle of the flaps as they are extended. Thus the front links 22 and 22a control the flap angle, while the rear links 23 in effect push the flaps away from the fixed wing and tracks as the two carriages in each track are moved to the rear by a differential drive to be now described.

Figure 9 shows a section through the driving axis of the gear box 35 mounted on a spanwise beam 36 forming part of the wing structure. A shaft 37 journalled therein normal to the track axis carries chain sprockets 38 and 39, sprocket 38 being of larger diameter than sprocket 39 to give higher speed to a chain 40 engaging said sprocket 38. A lower speed chain 41 is driven by the sprocket 39. The chains run parallel to and on opposite sides of the carriage tracks 25, and the faster chain 40 is fastened to the front carriage 24 at 42 by screws replacing the chain pins as shown in Figure 4. The slower chain 41 is fastened to the rear carriage at 43 as shown in Figure 5. Both chains 40 and 41 are supported at the outboard end of the tracks 25 by sprockets 44 carried by the shaft 44a pivoted in brackets 45 attached to a narrow extension 46 of the upper wing skin. The shaft 37 carries a central gear 47 meshing with a driving gear 48 on a shaft 49 having driving splines at each end. As shown in Figures 9 and 10 the gears 47 and 48 are skew gears to accommodate the swept angle of the outer flap 20; and it will be evident that the shafts 37 and 49 should be parallel for the inboard flap 19; where its gear boxes may also be squarely mounted on a wing beam 50 normal to the fuselage axis 18. The driving splines of the shafts 49 in the series of gear boxes are interconnected by tubular shafts 51, those in the swept flap 20 being connected to those in the inboard flap 19 through an angle drive such as a constant velocity universal joint or a bevel gear box 52. The flap drives in both wings are preferably connected through a common driving mechanism (not shown) by similar tubular shafts 53 inside the fuselage.

To summarize the operation of this invention, the inboard and outboard flaps are simultaneously moved parallel to the axis of the airplane, and a separate flap section is used for each change in the angle of the wing trailing edge, since the several actuators for each flap must have their pivot points aligned with each other and parallel to the wing trailing edge in the particular flap area involved, because the motion of each flap is coordinated with the bottom surface of the wing, and in the flap retracted position the flap fairs into the profile of the lower wing surface.

In the flap retracted position the carriage 24 for each front link 22 at the inner end of the tracks 25 is attached to the chain running over the larger sprocket 38 on the gear box 35. The carriage for the rear link 23 is then located about half way along the tracks and is attached to the slower chain 41 at this point. The chain sprockets 38 and 39 are so related as to give a differential drive to the chains which causes the front link carriage to catch up with the rear link carriage so that when the latter reaches the end of the track the front carriage and link force both the flap and the rear link to pivot, pushing and tilting the flap into the extended position shown in Figure 2 the flap tilting about the front link carriage during the extension movement.

It will be apparent that the first part of the flap travel during extension acts to effectively increase the wing camber to predominately increase wing lift, acting to reduce the take-off and landing speeds necessary. Further flap extension increasingly tilts the flap downwardly and opens up a gap between the fixed part of the wing and the nose of the flap to provide airflow thereover to postpone the stalling of the flap. At full extension the flap angle is so extreme as to practically nullify flap lift, while greatly increasing the drag thereof and thus provides an air brake effect most effective during the initial touch down where only a small portion of the airplane weight has transferred to the landing gears to render the wheel brakes effective.

Each flap can be provided with as many actuators as may be desired for structural or other reasons as all the actuators are driven synchronously by the series drive through the various gear boxes.

It will be thus seen that I have invented an improved and simplified flap operating mechanism whereby a series of flaps can be extended parallel to the airplane axis, regardless of sweep angle or changes thereof at the trailing edge of the wings and which can be used within the profile of very thin wing sections.

Having thus described my invention and the present preferred embodiments thereof, I desire to emphasize the fact that many modifications may be resorted to in manner limited only by a just interpretation of the following claims.

I claim as my invention:

1. Extendable trailing edge flaps for swept wings having changes in the swept angle along the trailing edges of the wing comprising a separate flap for each variation in swept angle of the trailing edge of the wing, each flap being disposed parallel to the swept angle at its location along the trailing edge of the wing, flap tracks carried by said wing and disposed parallel to the direction of airflow over said wing flap, a pair of actuating carriages movable in each of said tracks, and means connecting adjacent flaps to common carriages between the adjacent flaps and operable in a single track, said last mentioned means having universal connections to each flap to accommodate angular movements between the flaps.

2. Extendable flaps as defined in claim 1 wherein two differentially movable carriages operate in each track, and means responsive to differential movements between the two carriages in each track arranged to tilt the flaps.

3. In combination with an airfoil, an airfoil pocket and an extendable trailing edge flap normally nested in the pocket in a position flush with the lower surface of the airfoil for extension parallel with the airflow over the airfoil; at least two mechanisms for extending and retracting said flap, each comprising front and rear carriages and a straight track carried by the airfoil movably supporting said front and rear carriages; a front link attached to the flap adjacent to the nose thereof and pivotably attached to said front carriage, a rear link pivotably attached to the rear carriage and to the flap rearwardly of the front carriage link, and a pair of chains driven at different speeds for simultaneously and differentially driving said front and rear carriages along said track whereby the front carriage tends to overtake the rear carriage when the flap is being extended and thereby cause the rear link to push the rear end of the flap downwardly about the front link mounting to the front carriage as a pivot.

4. A flap actuating system as defined in claim 3 wherein interconnected gear boxes having separate chain drives differentially move the front and rear carriages so that the front carriage travels at a rate faster than the rear carriage.

5. In combination with an airfoil, an airfoil pocket and an extendable trailing edge flap normally nested in the pocket in a position flush with the lower surface of the airfoil for extension parallel with the airflow over the airfoil; at least two mechanisms for extending and retracting said flap, each comprising front and rear carriages and a straight track carried by the airfoil movably supporting said front and rear carriages; a front link attached to the flap adjacent to the nose thereof and pivotably attached to said front carriage, and a rear link pivotably attached to the rear carriage and to the flap rearwardly of the front carriage link, a pair of chains connected to the front and rear carriages respectively, and means for driving said pair of chains at different speeds for simultaneous and differential movement of said front and rear carriages along said track whereby the flap is extended and the rear end of the flap pushed downwardly.

6. In combination with an airfoil, an airfoil pocket and an extendable trailing edge flap normally nested in the pocket in a position flush with the lower surface of the airfoil for extension parallel with the airflow over the airfoil; at least two mechanisms for extending and retracting said flap, each comprising front and rear carriages and a straight track carried by the airfoil movably supporting said front and rear carriages; a front link attached to the flap adjacent to the nose thereof and pivotally attached to said front carriage, a rear link pivotally attached to the rear carriage and to the flap rearwardly of the front carriage link, and a pair of chains driven at different speeds for simultaneously and differentially driving said front and rear carriages along the said track, the faster chain being connected to the front carriage and the slower chain being connected to the rear carriage whereby the front carriage tends to overtake the rear carriage when the flap is being extended and thereby cause the rear link to push the rear end of the flap downwardly about the front link mounting to the front carriage as a pivot.

7. In combination with an airfoil, an airfoil pocket and an extendable trailing edge flap normally nested in the pocket in a position flush with the lower surface of the airfoil for extension parallel with the airflow over the airfoil; at least two mechanisms for extending and retracting said flap, each comprising front and rear carriages and a straight track carried by the airfoil movably supporting said front and rear carriages; a front link attached to the flap adjacent to the nose thereof and pivotally attached to said front carriage, a rear link pivotally attached to the rear carriage and to the flap rearwardly of the front carriage link and means for simultaneously and differentially driving the front and rear carriages in each mechanism comprising interconnected gear boxes having separate chain drives connected to the front and rear carriages.

References Cited in the file of this patent

UNITED STATES PATENTS

| | | |
|---|---|---|
| 2,188,083 | Koppen | Jan. 23, 1940 |
| 2,202,430 | Rebeski | May 28, 1940 |
| 2,226,811 | Evans | Dec. 31, 1940 |
| 2,273,881 | Naumann | Feb. 24, 1942 |
| 2,295,306 | Tampier | Sept. 8, 1942 |
| 2,298,264 | Czurles et al. | Oct. 13, 1942 |
| 2,346,464 | Tampier | Apr. 11, 1944 |
| 2,348,150 | Richter | May 2, 1944 |
| 2,494,208 | Schultz | Jan. 10, 1950 |
| 2,516,406 | Moyer | July 25, 1950 |
| 2,620,147 | Butler et al. | Dec. 2, 1952 |

FOREIGN PATENTS

| | | |
|---|---|---|
| 498,516 | Great Britain | Jan. 9, 1939 |
| 748,146 | Germany | Oct. 27, 1944 |
| 870,963 | France | Apr. 1, 1942 |
| 878,604 | France | Oct. 19, 1942 |